US012800839B2

(12) United States Patent

Kimura et al.

(10) Patent No.: US 12,800,839 B2
(45) Date of Patent: Nov. 17, 2026

(54) MACH-ZEHNDER-TYPE OPTICAL MODULATOR AND OPTICAL TRANSMISSION DEVICE

(71) Applicant: Mitsubishi Electric Corporation, Tokyo (JP)

(72) Inventors: Kosuke Kimura, Tokyo (JP); Takashi Nagira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 168 days.

(21) Appl. No.: 18/867,624

(22) PCT Filed: Sep. 20, 2022

(86) PCT No.: PCT/JP2022/034928
§ 371 (c)(1),
(2) Date: Nov. 20, 2024

(87) PCT Pub. No.: WO2024/062518
PCT Pub. Date: Mar. 28, 2024

(65) Prior Publication Data

US 2026/0194771 A1 Jul. 9, 2026

(51) Int. Cl.
*G02F 1/017* (2006.01)
*G02F 1/21* (2006.01)

(52) U.S. Cl.
CPC .............. *G02F 1/017* (2013.01); *G02F 1/212* (2021.01); *G02F 2202/101* (2013.01)

(58) Field of Classification Search
None
See application file for complete search history.

(56) References Cited

U.S. PATENT DOCUMENTS

2012/0308173 A1 12/2012 Yagi
2018/0164654 A1 6/2018 Ogiso et al.
(Continued)

FOREIGN PATENT DOCUMENTS

JP 2012-252139 A 12/2012
JP 2015-015396 A 1/2015
(Continued)

OTHER PUBLICATIONS

International Search Report issued in PCT/JP2022/034928 mailed on Nov. 8, 2022.

(Continued)

*Primary Examiner* — Phu Vu
(74) *Attorney, Agent, or Firm* — Studebaker Brackett PLLC

(57) ABSTRACT

An n-type diffusion prevention layer (11*b*, 30*b*) is provided on a substrate (10) of semi-insulating or p-type. A p-type cladding layer (12*b*, 13*b*) is provided on the n-type diffusion prevention layer (11*b*, 30*b*). First and second quantum well active layers (14*b*, 14*c*) are provided on the p-type cladding layer (12*b*, 13*b*) separately from each other. First and second n-type cladding layers (15*b*, 15*c*) are provided respectively on the first and second quantum well active layers (14*b*, 14*c*). First and second traveling-wave electrodes (20*a*, 20*b*) are respectively connected to the first and second n-type cladding layers (15*b*, 15*c*). A DC bias electrode (27) is connected to the p-type cladding layer (12*b*, 13*b*) and not directly connected to the n-type diffusion prevention layer (11*b*, 30*b*).

5 Claims, 18 Drawing Sheets

(56) References Cited

U.S. PATENT DOCUMENTS

| | | | | |
|---|---|---|---|---|
| 2021/0103198 | A1 | 4/2021 | Ozaki et al. | |
| 2022/0066280 | A1 * | 3/2022 | Kono | G02F 1/212 |

FOREIGN PATENT DOCUMENTS

| | | | | |
|---|---|---|---|---|
| JP | 2018189780 | A * | 11/2018 | |
| JP | 2019-095516 | A | 6/2019 | |
| JP | 2022-037930 | A | 3/2022 | |
| WO | 2016/194369 | A1 | 12/2016 | |
| WO | 2018/194044 | A1 | 10/2018 | |
| WO | WO-2023095261 | A1 * | 6/2023 | G02F 1/017 |

OTHER PUBLICATIONS

Office Action issued in JP 2023-500385; issued by the Japanese Patent Office on Mar. 28, 2023.

Stievater et al., "Enhanced Electro-Optic Phase Shifts in Suspended Waveguides", Optics Express, OSA, Jan. 18, 2010, vol. 18, No. 2, pp. 885-892.

* cited by examiner

FIG. 6

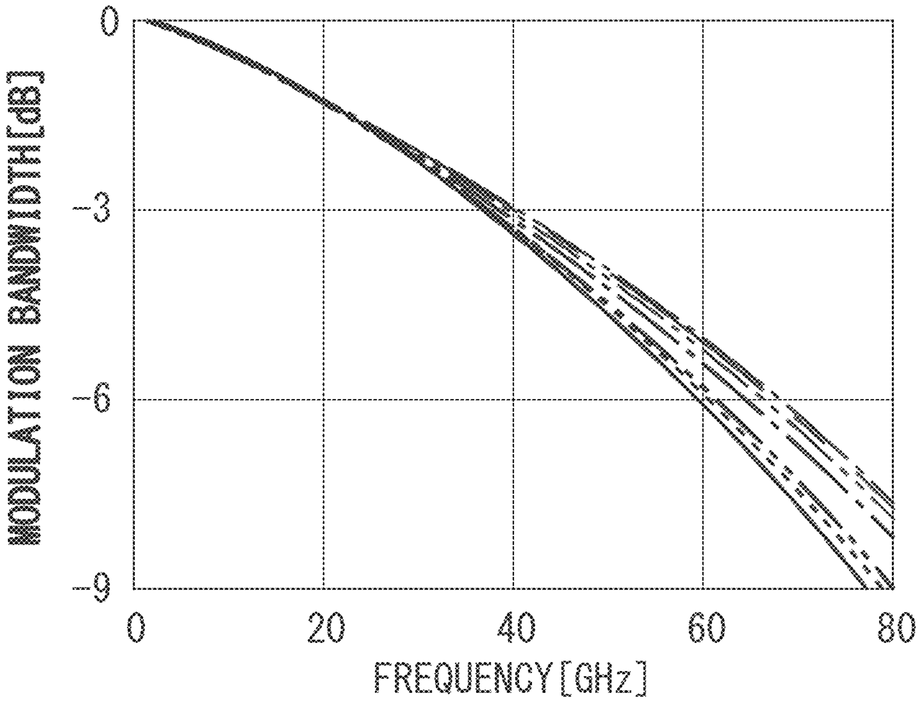

N-TYPE DIFFUSION PREVENTION LAYER=6 μm

N-TYPE DIFFUSION PREVENTION LAYER=3 μm

N-TYPE DIFFUSION PREVENTION LAYER=2.5 μm

N-TYPE DIFFUSION PREVENTION LAYER=2 μm

N-TYPE DIFFUSION PREVENTION LAYER=1.5 μm

N-TYPE DIFFUSION PREVENTION LAYER=1 μm

N-TYPE DIFFUSION PREVENTION LAYER=0.5 μm

N-TYPE DIFFUSION PREVENTION LAYER=0.1 μm

N-TYPE DIFFUSION PREVENTION LAYER=0.05 μm

NO N-TYPE DIFFUSION PREVENTION LAYER

MACH-ZEHNDER-TYPE OPTICAL MODULATOR AND OPTICAL TRANSMISSION DEVICE

FIELD

The present disclosure relates to a Mach-Zehnder-type optical modulator and an optical transmission device.

BACKGROUND

Communication traffic is increasing with the spread of cloud services. It is assumed that technologies of IoT (Internet of Things) and the fifth generation mobile communication system called 5G become widespread and AI (Artificial Intelligence) and the like that process an enormous amount of data will also penetrate into the society. Increasingly higher speeds and larger capacities may thus be requested for optical communication systems. In order to meet these requests, a multilevel technology through use of a digital coherent communication technology in which not only light intensity but also phase or polarization can be given signals is developing. In multilevel optical modulators, a Mach-Zehnder modulator that can control each of amplitude and phase of light and can generate an optical modulation signal with zero chirp is used. Increasingly higher response speeds are being required for modulators in order to increase signal capacity per hour. Optical modulators that can input a modulation electric signal of more than or equal to 64 GBaud or 96 GBaud with low loss and generate a high-speed modulation optical signal by virtue of an electro-optic interaction are desired.

In order to achieve the above-described optical modulators, Mach-Zehnder-type optical modulators including traveling-wave electrodes are being developed vigorously. A traveling-wave electrode interacts with an optical wave propagating through an optical waveguide. Adoption of a high-frequency line structure in which a traveling-wave electrode is optimized so as to be driven by a differential signal enables driving by a differential driver having high power efficiency.

Firstly, the above-described traveling-wave electrode is requested to match a characteristic impedance of a driver, a termination resistance, and an impedance of the traveling-wave electrode. Secondly, it is requested that a microwave propagating through the electrode and light traveling through a waveguide installed in the vicinity of the electrode should be matched in propagation velocity. Thirdly, it is requested that loss of the microwave propagating through the electrode should be reduced.

If the first impedance matching is not obtained, reflection occurs when an electric signal is input from the driver to the traveling-wave electrode, which results in power loss. Moreover, in a termination resistance portion, the electric signal reflected due to impedance mismatching travels backward through the traveling-wave electrode, so that light reacts also with the backward travelling wave, causing degradation of a modulation waveform. If the second velocity matching is not obtained, a phase shift occurs from modulated light subjected to modulation by an electric field amplitude while propagating together with the microwave. The phase shift remarkably appears particularly at higher frequencies where the microwave has a shorter wavelength, leading to degradation of the modulation bandwidth. The third reduction in loss may be accomplished by increasing the electro-optic interaction (refractive index change) per unit length and reducing a modulator length for obtaining a resultantly required amount of phase rotation, but is accomplished more essentially by reducing a semiconductor resistance between traveling-wave electrodes. Particularly at high frequencies, loss resulting from the semiconductor resistance and a contact resistance between the traveling-wave electrodes is dominant, and it is important to reduce these resistances for improving the modulation bandwidth.

A Mach-Zehnder-type optical modulator which includes a lower-layer n-type cladding layer, a p-type carrier block layer, a core layer, and an upper-layer n-type cladding layer stacked sequentially on a substrate and applies a DC bias to the lower-side n-type cladding layer is disclosed (see, for example, FIGS. 7 and 8 of Patent Literature 1). In such a case where the lower-layer cladding layer is of the n-type, a lower-layer semiconductor resistance decreases.

CITATION LIST

Patent Literature

[PTL 1] WO 2016/194369 A1

SUMMARY OF THE INVENTION

Problems to be Solved by the Invention

However, in a Mach-Zehnder-type optical modulator which includes a p-type cladding layer, an active layer, and an n-type cladding layer stacked sequentially on a substrate and applies a DC bias to the p-type cladding layer, a lower-layer cladding layer is of the p-type. Consequently, a lower-layer semiconductor resistance increases, which raises a problem in that the modulation bandwidth cannot be improved.

The present disclosure has been made to solve problems as described above and has an object to obtain a Mach-Zehnder-type optical modulator and an optical transmission device, in which even in a case where a lower-layer cladding layer is of the p-type, a lower-layer semiconductor resistance can be reduced to improve the modulation bandwidth.

Solution to Problem

A Mach-Zehnder-type optical modulator according to the present disclosure includes: a substrate of semi-insulating or p-type; an n-type diffusion prevention layer provided on the substrate; a p-type cladding layer provided on the n-type diffusion prevention layer; first and second quantum well active layers provided on the p-type cladding layer separately from each other; first and second n-type cladding layers provided respectively on the first and second quantum well active layers; first and second traveling-wave electrodes respectively connected to the first and second n-type cladding layers; and a DC bias electrode connected to the p-type cladding layer and not directly connected to the n-type diffusion prevention layer, wherein the DC bias electrode, the p-type cladding layer, the first quantum well active layer, the first n-type cladding layer, and the first traveling-wave electrode constitute a first optical modulation unit, and the DC bias electrode, the p-type cladding layer, the second quantum well active layer, the second n-type cladding layer, and the second traveling-wave electrode constitute a second optical modulation unit.

Another Mach-Zehnder-type optical modulator according to the present disclosure includes: a p-type semiconductor substrate having a thickness of more than or equal to 10 μm; a p-type cladding layer provided on the p-type semiconductor substrate; first and second quantum well active layers provided on the p-type cladding layer separately from each other; first and second n-type cladding layers provided respectively on the first and second quantum well active layers; first and second traveling-wave electrodes respectively connected to the first and second n-type cladding layers; and a DC bias electrode connected to the p-type cladding layer, wherein the DC bias electrode, the p-type cladding layer, the first quantum well active layer, the first n-type cladding layer, and the first traveling-wave electrode constitute a first optical modulation unit, and the DC bias electrode, the p-type cladding layer, the second quantum well active layer, the second n-type cladding layer, and the second traveling-wave electrode constitute a second optical modulation unit.

Advantageous Effects of Invention

In the Mach-Zehnder-type optical modulator according to the present disclosure, Since the DC bias electrode is connected to the p-type cladding layer, the lower-layer cladding layer is of the p-type. Since the n-type diffusion prevention layer is provided between the substrate and the p-type cladding layer, the n-type semiconductor resistance is connected in parallel to the lower-layer semiconductor resistance composed of p-type semiconductor. Consequently, the lower-layer semiconductor resistance can be reduced even in the case where the lower-layer cladding layer is of the p-type. As a result, the semiconductor resistance between the two optical modulation units considerably decreases, which can reduce loss of the microwave propagating through the traveling-wave electrodes to considerably improve the modulation bandwidth.

In another Mach-Zehnder-type optical modulator according to the present disclosure, the thickness of the p-type semiconductor substrate is more than or equal to 10 μm. This can reduce the lower-layer semiconductor resistance to further improve the modulation bandwidth.

BRIEF DESCRIPTION OF THE DRAWINGS

FIG. 6 is a diagram showing a result obtained by calculating the modulation bandwidth while varying the thickness of the n-type diffusion prevention layers in the first embodiment.

DESCRIPTION OF EMBODIMENTS

A Mach-Zehnder-type optical modulator and an optical transmission device according to the embodiments of the present disclosure will be described with reference to the drawings. The same components will be denoted by the same symbols, and the repeated description thereof may be omitted.

First Embodiment

Figure 1:
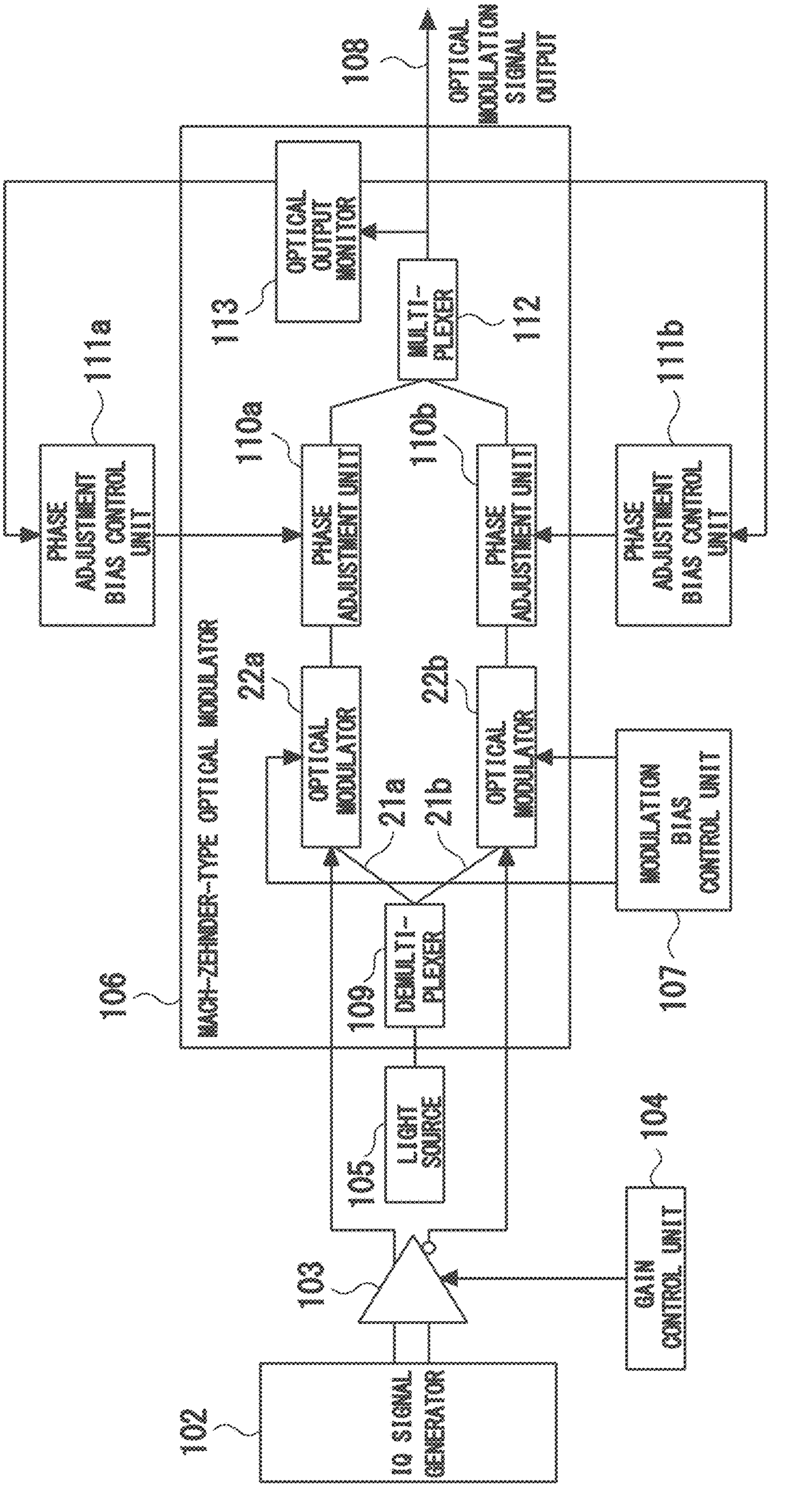
FIG. 1 is a diagram showing an optical transmission device according to a first embodiment.

FIG. 1 is a diagram showing an optical transmission device according to a first embodiment. Although only one optical transmission device is shown here, a configuration in which a plurality of similar optical transmission devices are aligned may be adopted. An IQ signal generator 102 generates a differential modulation signal. A driver 103 amplifies the differential modulation signal. A gain control unit 104 controls gain of the driver 103. A Mach-Zehnder-type optical modulator 106 modulates light from a light source 105 such as laser in response to a signal from the driver 103 and outputs an optical modulation signal to an optical output waveguide 108.

The Mach-Zehnder-type optical modulator 106 has a demultiplexer 109, arm waveguides 21*a*, 21*b*, optical modulation units 22*a*, 22*b*, phase adjustment units 110*a*, 110*b*, phase adjustment bias control units 111*a*, 111*b*, a multiplexer 112, and an optical output monitor 113.

The arm waveguide 21*a*, the optical modulation unit 22*a*, and the phase adjustment unit 110*a* constitute a first arm. The arm waveguide 21*b*, the optical modulation unit 22*b*, and the phase adjustment unit 110*b* constitute a second arm. The demultiplexer 109 divides light output from the light source 105 to input the light to the first arm and the second arm.

The optical modulation unit 22*a* changes a refractive index of the waveguide through which an optical signal passes based on an I-channel modulation signal input from the IQ signal generator 102 and a bias signal input from a modulation bias control unit 107. The optical modulation unit 22*a* thereby modulates the phase of the optical signal to generate a first optical modulation signal. The optical modulation unit 22*b* changes the refractive index of the waveguide based on the I-channel modulation signal input from the IQ signal generator 102 and the bias signal input from the modulation bias control unit 107. The optical modulation unit 22*b* thereby modulates the phase of the optical signal to generate a second optical modulation signal. Note that any modulation scheme may be adopted for a multilevel signal input from the IQ signal generator 102.

The phase adjustment unit 110*a* adjusts the phase of the first optical modulation signal at a phase rotation rate determined based on a bias signal from the phase adjustment bias control unit 111*a*. The phase adjustment unit 110*b* adjusts the phase of the second optical modulation signal at a phase rotation rate determined based on a bias signal from the phase adjustment bias control unit 111*b*. The multiplexer 112 multiplexes an output signal of the phase adjustment unit 110*a* and an output signal of the phase adjustment unit 110*b*.

The optical output monitor 113 monitors an output signal of the multiplexer 112. The phase adjustment bias control units 111*a* and 111*b* adjust biases to be applied to the phase adjustment units 110*a* and 110*b* in accordance with a detection signal of the optical output monitor 113. Specifically, the phase adjustment units 110*a* and 110*b* adjust the phases such that the optical signals to be output from the phase adjustment units 110*a* and 110*b* have a phase difference of T/2. Light rays thus output from the first arm and the second arm are multiplexed and output to the outside via the optical output waveguide 108.

The optical modulation units 22*a* and 22*b* are made of a compound semiconductor such as lithium niobate ($LiNbO_3$) or indium phosphide (InP), for example. In a case where lithium niobate is used, the refractive index in the waveguide is changed by the Pockels effect to perform phase modulation. In this case, there are advantages of low light absorption and low temperature dependency, but a high frequency characteristic is a challenge. On the other hand, in a case where a compound semiconductor is used, phase modulation can be performed by the quantum confined Stark effect. In this case, an excellent high frequency characteristic can be obtained from a high mobility. The compound semiconductor is also excellent in integration performance, which enables size reduction of the Mach-Zehnder-type optical modulator 106.

Not only the optical modulation units 22*a* and 22*b* but also the demultiplexer 109, the arm waveguides 21*a*, 21*b*, the multiplexer 112, the optical output monitor 113, the light source 105, and the like may be integrally formed on the compound semiconductor substrate. A compact and integrated optical transmission device can be formed by adopting a structure in which devices are connected with an optical waveguide. Note that optical modulator devices other than Mach-Zehnder-type may be used instead of the optical modulation units 22*a* and 22*b*.

Figure 2:
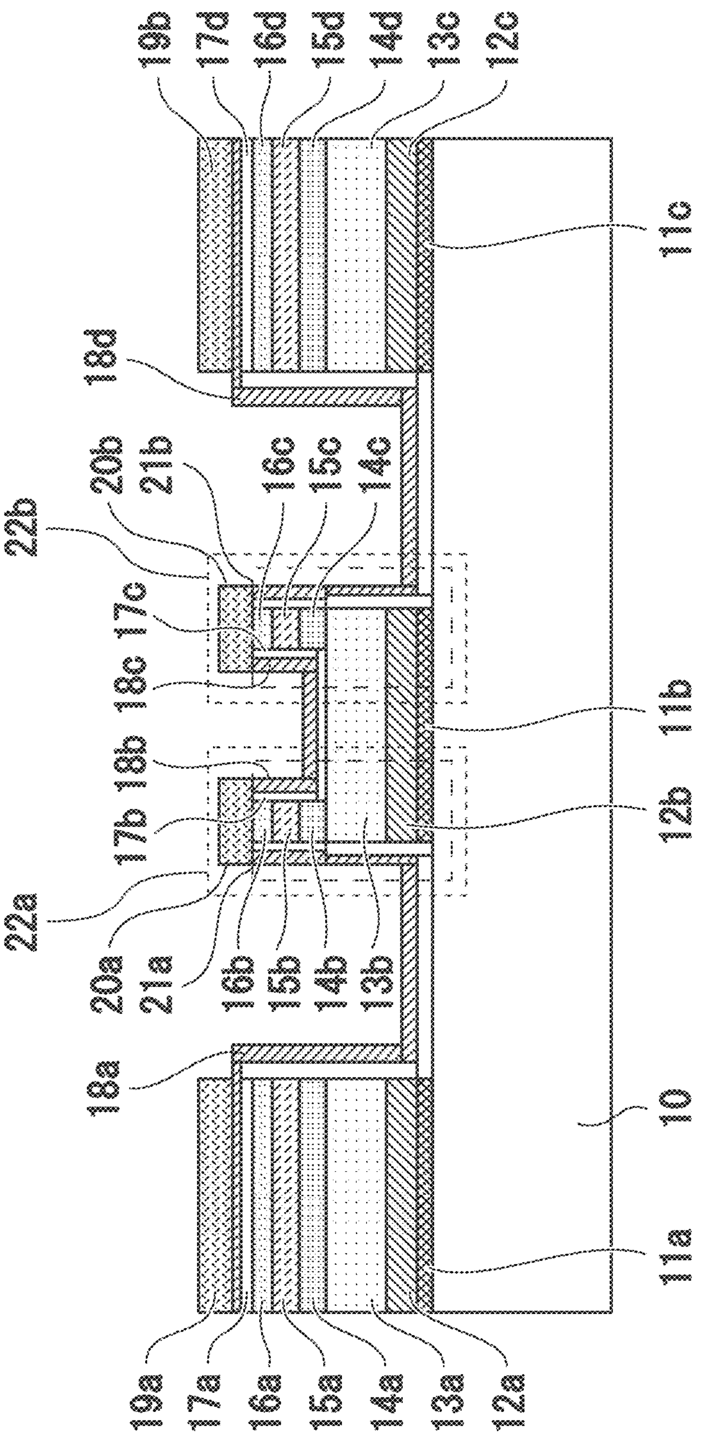
FIG. 2 is a cross-sectional view showing refractive index modulation regions of the Mach-Zehnder-type optical modulator according to the first embodiment.

FIG. 2 is a cross-sectional view showing refractive index modulation regions of the Mach-Zehnder-type optical modulator according to the first embodiment. The refractive index modulation regions are regions in which an electro-optic effect is provoked in quantum well active layers by application of a voltage, thereby modulating the refractive index of a core layer, and correspond to the optical modulation units 22*a* and 22*b* in FIG. 1.

The substrate 10 is a semi-insulating semiconductor substrate made of Fe—InP, for example, but may be a p-type semiconductor substrate. N-type diffusion prevention layers 11*a*, 11*b*, and 11*c* made of an n-type semiconductor are provided on the substrate 10 separately from one another. The n-type diffusion prevention layers 11*a*, 11*b*, and 11*c* are made of n-type InP having a carrier concentration of 2.0E+18 $cm^{-3}$, for example. P-type InGaAs layers 12*a*, 12*b*, and 12*c* made of a p-type semiconductor are provided respectively on the n-type diffusion prevention layers 11*a*, 11*b*, and 11*c*. The p-type InGaAs layers 12*a*, 12*b*, and 12*c* have a carrier concentration of 1.5E+19 $cm^{-3}$, for example.

P-type cladding layers 13*a*, 13*b*, and 13*c* made of a p-type semiconductor are provided respectively on the p-type InGaAs layers 12*a*, 12*b*, and 12*c*. The p-type cladding layers 13*a*, 13*b*, and 13*c* are made of p-type InP having a carrier concentration of 2.0E+18 $cm^{-3}$, for example. A quantum well active layer 14*a* is provided on the p-type cladding layer 13*a*. Quantum well active layers 14*b* and 14*c* are provided on the p-type cladding layer 13*b* separately from each other. A quantum well active layer 14*d* is provided on the p-type cladding layer 13*c*. The quantum well active layers 14*a*, 14*b*, 14*c*, and 14*d* are made of an AlGaInAs mixed crystal, for example.

N-type cladding layers 15*a*, 15*b*, 15*c*, and 15*d* made of an n-type semiconductor are provided respectively on the quantum well active layers 14*a*, 14*b*, 14*c*, and 14*d*. The n-type cladding layers 15*a*, 15*b*, 15*c*, and 15*d* are made of n-type InP having a carrier concentration of 2.0E+18 $cm^{-3}$, for example. N-type contact layers 16*a*, 16*b*, 16*c*, and 16*d* made of an n-type semiconductor are provided respectively on the n-type cladding layers 15*a*, 15*b*, 15*c*, and 15*d*. The n-type contact layers 16*a*, 16*b*, 16*c*, and 16*d* are made of n-type InGaAs having a carrier concentration of 1.0E+19 $cm^{-3}$, for example.

The arm waveguide 21*a* includes the substrate 10 as well as the n-type diffusion prevention layer 11*b*, the p-type InGaAs layer 12*b*, the p-type cladding layer 13*b*, the quantum well active layer 14*b*, the n-type cladding layer 15*b*, and the n-type contact layer 16*b* stacked sequentially on the substrate 10. The arm waveguide 21*b* includes the substrate 10 as well as the n-type diffusion prevention layer 11*b*, the p-type InGaAs layer 12*b*, the p-type cladding layer 13*b*, the quantum well active layer 14*c*, the n-type cladding layer 15*c*, and the n-type contact layer 16*c* stacked sequentially on the substrate 10. The arm waveguides 21*a* and 21*b* are separate from each other on the p-type cladding layer 13*b*.

Side surfaces of the quantum well active layers 14*b*, 14*c*, the n-type cladding layers 15*b*, 15*c*, and the n-type contact layers 16*b*, 16*c* are covered by semi-insulating semiconductor buried layers 17*a*, 17*b*, 17*c*, and 17*d* and insulating films 18*a*, 18*b*, 18*c*, and 18*d*. Ground electrodes 19*a* and 19*b* are provided respectively on the n-type contact layers 16*a* and 16*d* with the semiconductor buried layers 17*a*, 17*d* and the insulating films 18*a*, 18*d* interposed therebetween. Traveling-wave electrodes 20*a* and 20*b* are provided respectively on and electrically connected to the n-type contact layers 16*b* and 16*c*.

Figure 3:
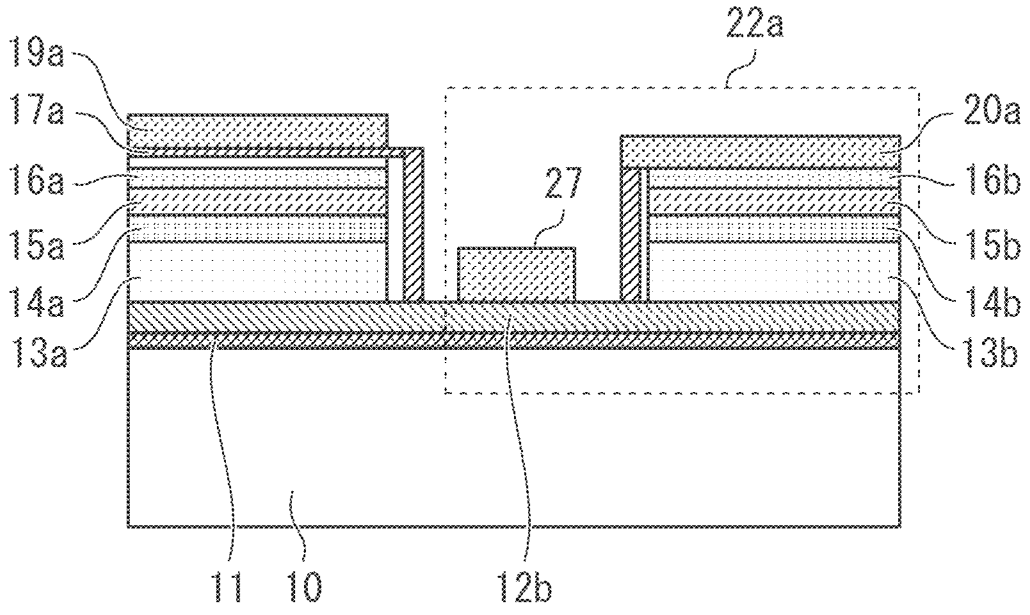
FIG. 3 is a cross-sectional view showing a periphery of a DC bias electrode of the Mach-Zehnder-type optical modulator according to the first embodiment.

FIG. 3 is a cross-sectional view showing a periphery of a DC bias electrode of the Mach-Zehnder-type optical modulator according to the first embodiment. A DC bias electrode 27 is joined to the p-type InGaAs layer 12*b*. Consequently, the DC bias electrode 27 is connected to the p-type cladding layer 13*b* via the p-type InGaAs layer 12*b*.

The DC bias electrode 27, the arm waveguide 21*a*, and the traveling-wave electrode 20*a* constitute the optical modulation unit 22*a*. Similarly, the DC bias electrode 27, the arm waveguide 21*b*, and the traveling-wave electrode 20*b* constitute the optical modulation unit 22*b*. The optical modulation units 22*a* and 22*b* are separate from each other above the p-type cladding layer 13*b*. On the other hand, the p-type cladding layer 13*b* of the optical modulation unit 22*a* and the p-type cladding layer 13*b* of the optical modulation unit 22*b* are not separate from each other.

A predetermined DC bias is applied between the DC bias electrode 27 and the traveling-wave electrodes 20*a*, 20*b* to apply a reverse electric field to the quantum well active layers 14*b* and 14*c*. Then, a high-frequency differential modulation signal output from the driver 103 is applied to the traveling-wave electrodes 20*a* and 20*b*. The Mach-Zehnder-type optical modulator is thereby driven as a modulator. Note that in order to prevent an increase in leak current to ensure electric long-term reliability of the optical modulator, the DC bias electrode 27 is not directly connected to the n-type diffusion prevention layers 11*a*, 11*b*, and 11*c*.

Impedance matching and velocity matching between light and a microwave need to be satisfied for speeding up the modulation operation. As an example, the traveling-wave electrodes 20*a* and 20*b* shall have a thickness of about 14 μm, a width of about 4.4 μm, and an electrode center-to-center distance of about 11 μm. The quantum well active layers 14*b*, 14*c*, the n-type cladding layers 15*b*, 15*c*, and the n-type contact layers 16*b*, 16*c* shall have a width of about 11 μm. The p-type InGaAs layer 12*b* shall have a thickness of about 0.8 μm. The p-type cladding layer 13*b* shall have a thickness of about 2.0 μm. The quantum well active layers 14*b* and 14*c* shall have a thickness of about 1.0 μm. The n-type cladding layers 15*b* and 15*c* shall have a thickness of about 1.2 μm, and the n-type contact layers 16*b* and 16*c* shall have a thickness of about 0.3 μm. The quantum well active layers 14*b*, 14*c* and the semi-insulating semiconductor buried layers 17*a*, 17*b*, 17*c*, and 17*d* shall have a dielectric constant of approximately 14. Under these conditions, a differential impedance can be matched with 65Ω, and the propagation velocity of the microwave can be matched with the propagation velocity of light guided through the waveguides having a refractive index of 3.5. Note that not only the above-described parameters but also the thicknesses and widths of the traveling-wave electrodes and the semiconductor layers, spacing between the traveling-wave electrodes, spacing between the traveling-wave electrodes and the ground electrodes, and the like have influence upon impedance matching and propagation velocity matching.

When seeking to further improve the modulation bandwidth, it is effective to shorten a traveling-wave electrode structure length. The arm waveguides 21*a* and 21*b* are made of a compound semiconductor such as lithium niobate ($LiNbO_3$) or indium phosphide (InP), for example. In the case where lithium niobate is used, the refractive index in the waveguides is changed by the Pockels effect to perform phase modulation. In this case, there are advantages of low light absorption and low temperature dependency, but a high frequency characteristic is a challenge. On the other hand, in a case where a compound semiconductor is used, phase modulation can be performed by the quantum confined Stark effect. In this case, an excellent high frequency characteristic can be obtained from a high mobility.

A surface of the substrate 10 has a plane orientation of <100>. An extending direction of the p-type cladding layer 13*b*, the quantum well active layers 14*b*, 14*c*, and the n-type cladding layers 15*b*, 15*c* is desirably <011> from constraints on a regrowth shape after the waveguides are formed. In the case of this extending direction, it can be anticipated that the phase modulation efficiency is improved by synergy between the quantum confined Stark effect and the Pockels effect by stacking the p-type cladding layer, the quantum well active layers, and the n-type cladding layers sequentially on the substrate 10. Consequently, reduction in a half-wavelength voltage characteristic which is one of principal characteristics of the Mach-Zehnder-type optical modulator and has a trade-off relationship with the modulation bandwidth can be expected, and improvement of the modulation bandwidth because of shortening of the traveling-wave electrode length can be expected.

Reduction in principal resistance components is also effective for improving the bandwidth. It is therefore common to configure the thicknesses and widths of the traveling-wave electrodes and the semiconductor layers, the spacing between the traveling-wave electrodes, and the like such that various resistance components are minimized upon satisfying impedance matching and propagation velocity matching. The main resistance components in the above-described structure are an electrode resistance of the traveling-wave electrodes 20*a*, 20*b*, an upper-layer semiconductor resistance of the n-type contact layers 16*b*, 16*c* and the n-type cladding layers 15*b*, 15*c*, and a lower-layer semiconductor resistance of the p-type cladding layer 13*b* and the p-type InGaAs layer 12*b*. The electrode resistance is connected in series to a passing route of a modulation signal, and the upper-layer and lower-layer semiconductor resistances are connected in parallel.

Since the optical modulation units 22*a* and 22*b* formed in isolation are connected with the p-type InGaAs layer 12*b* and the p-type cladding layer 13*b*, the lower-layer semiconductor resistance of the p-type InGaAs layer 12*b* and the p-type cladding layer 13*b* is dominant in a resistance value between the optical modulation units 22*a* and 22*b*. Consequently, it is considered effective for improving the modulation bandwidth to reduce the electrode resistance and the lower-layer semiconductor resistance in the Mach-Zehnder-type optical modulator.

Figure 4:
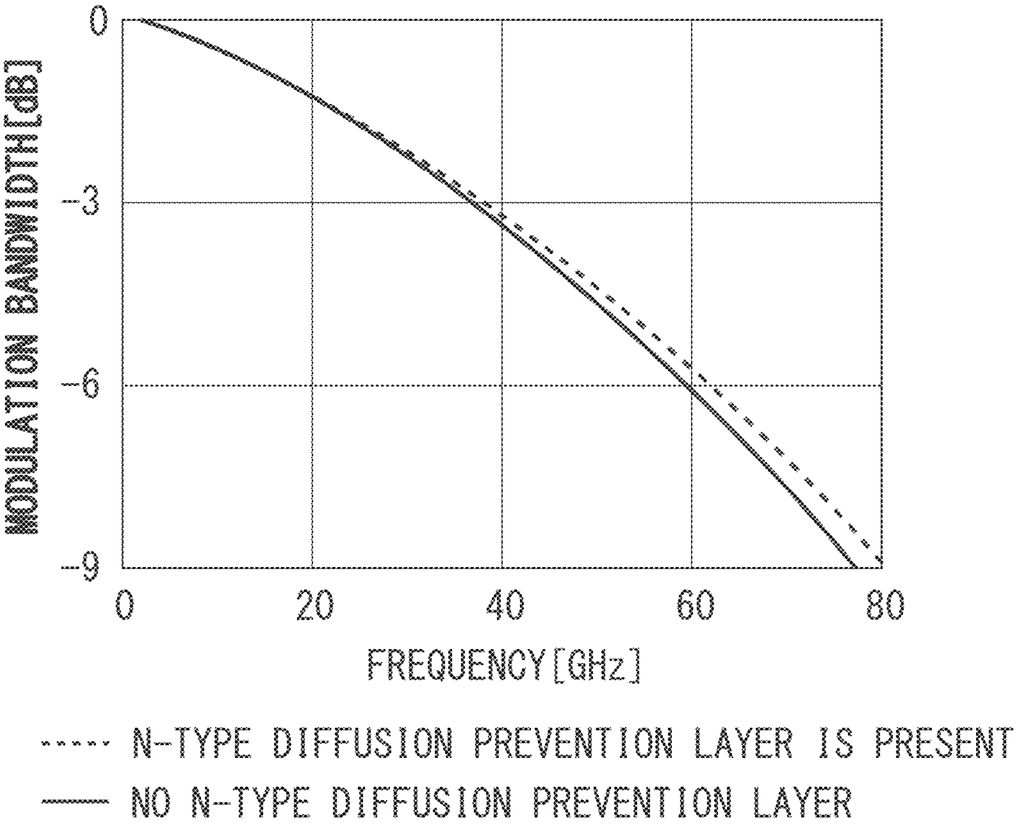
FIG. 4 is a diagram showing a result obtained by calculating frequency dependency of the modulation bandwidth according to the first embodiment.

Therefore, in the present embodiment, an n-type diffusion prevention layer 11 is provided between the substrate 10 and both the p-type InGaAs layer 12*b* and the p-type cladding layer 13*b*. FIG. 4 is a diagram showing a result obtained by calculating frequency dependency of the modulation bandwidth according to the first embodiment. It has been confirmed through an electromagnetic field analysis that the modulation bandwidth can be improved by providing the n-type diffusion prevention layer 11.

Since the DC bias electrode 27 is connected to the p-type cladding layer 13*b* in the present embodiment as described above, the lower-layer cladding layer is of the p-type. Since the n-type diffusion prevention layer 11 is provided between the substrate 10 and the p-type cladding layer 13*b*, the n-type semiconductor resistance is connected in parallel to the lower-layer semiconductor resistance composed of the p-type InGaAs layer 12*b* and the p-type cladding layer 13*b*. Consequently, the lower-layer semiconductor resistance can be reduced even in the case where the lower-layer cladding layer is of the p-type. As a result, the semiconductor resistance between the two optical modulation units 22*a* and 22*b* considerably decreases, which can reduce loss of the microwave propagating through the traveling-wave electrodes 20*a* and 20*b* to considerably improve the modulation bandwidth.

Since the modulation bandwidth can be improved with a very simple optical modulation unit structure without using a slab waveguide or capacitance-loaded traveling-wave electrode structure, size reduction of the Mach-Zehnder-type optical modulator and the optical transmission device can also be expected. The n-type diffusion prevention layers 11*a*, 11*b*, and 11*c* can prevent impurities from mutually diffusing between the p-type InGaAs layers 12*a*, 12*b*, 12*c* and the substrate 10.

Figure 5:
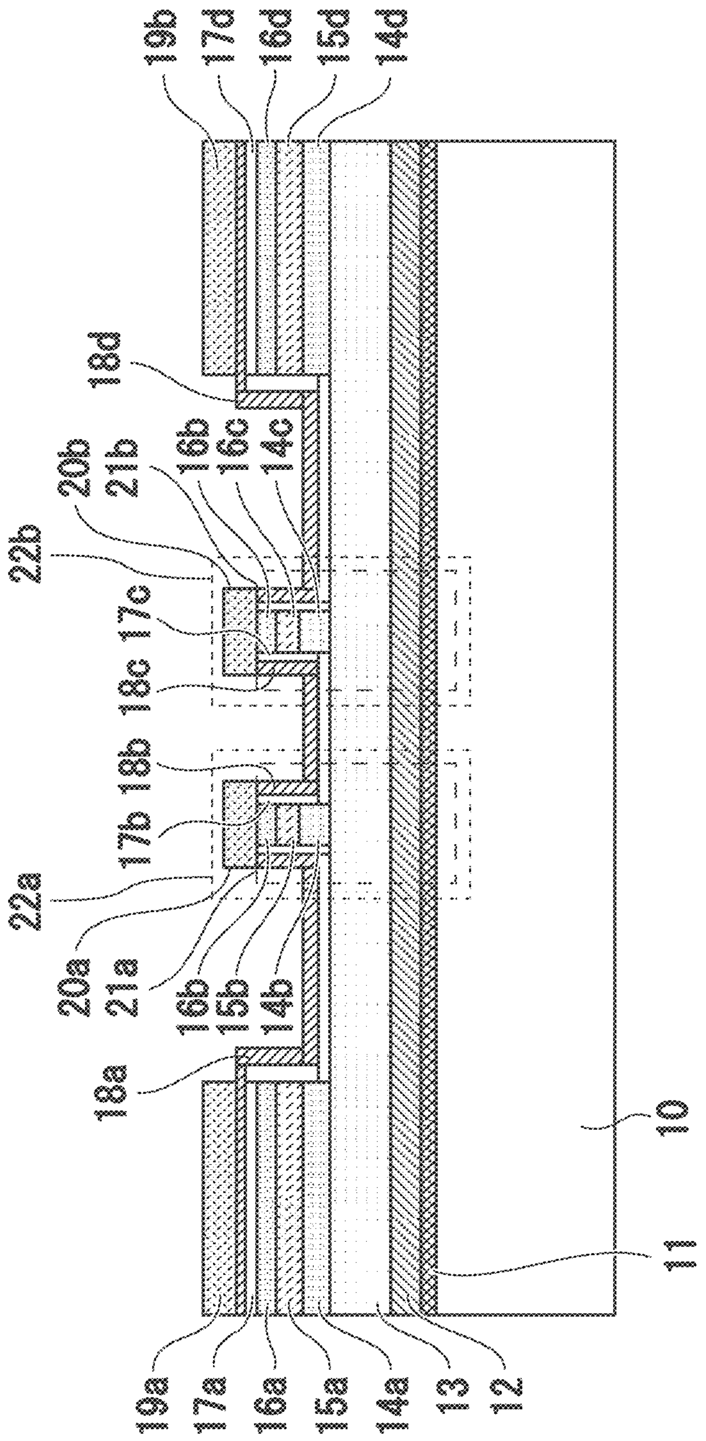
FIG. 5 is a cross-sectional view showing a modification of a refractive index modulation region of the Mach-Zehnder-type optical modulator according to the first embodiment.

FIG. 5 is a cross-sectional view showing a modification of a refractive index modulation region of the Mach-Zehnder-type optical modulator according to the first embodiment. The n-type diffusion prevention layers 11*a*, 11*b*, and 11*c* in FIG. 2 are unified to be the n-type diffusion prevention layer 11. The p-type InGaAs layers 12*a*, 12*b*, and 12*c* in FIG. 2 are unified to be a p-type InGaAs layer 12. The p-type cladding layers 13*a*, 13*b*, and 13*c* in FIG. 2 are unified to be a p-type cladding layer 13. Similar effects are also obtained in this structure. Unification enables a common impedance to be reduced. Matching with a common impedance of a desired differential driver can also inhibit bandwidth degradation that would be caused by a common mode resonance.

An increase in film thickness of the n-type diffusion prevention layers 11*a*, 11*b*, and 11*c* can reduce the lower-layer semiconductor resistance to further improve the modulation bandwidth. FIG. 6 is a diagram showing a result obtained by calculating the modulation bandwidth while varying the thickness of the n-type diffusion prevention layers in the first embodiment. The n-type diffusion prevention layers 11*a*, 11*b*, and 11*c* are made of n-type InP having a carrier concentration of 2.0E+18 $cm^{-3}$. It has been confirmed through an electromagnetic field analysis that the modulation bandwidth can be improved further by making the film thickness of the n-type diffusion prevention layers 11*a*, 11*b*, and 11*c* more than or equal to 0.05 μm. Note that similar effects can also be obtained in the structure of FIG. 5 in which the n-type diffusion prevention layers 11*a*, 11*b*, and 11*c* are unified, the p-type InGaAs layers 12*a*, 12*b*, and 12*c* are unified, and the p-type cladding layers 13*a*, 13*b*, and 13*c* are unified. Similar effects can also be obtained with the n-type diffusion prevention layers 11*a*, 11*b*, and 11*c* made of n-type InP having a carrier concentration of 1.0E+17 $cm^{-3}$ to 2.0E+19 $cm^{-3}$.

Second Embodiment

Figure 7:
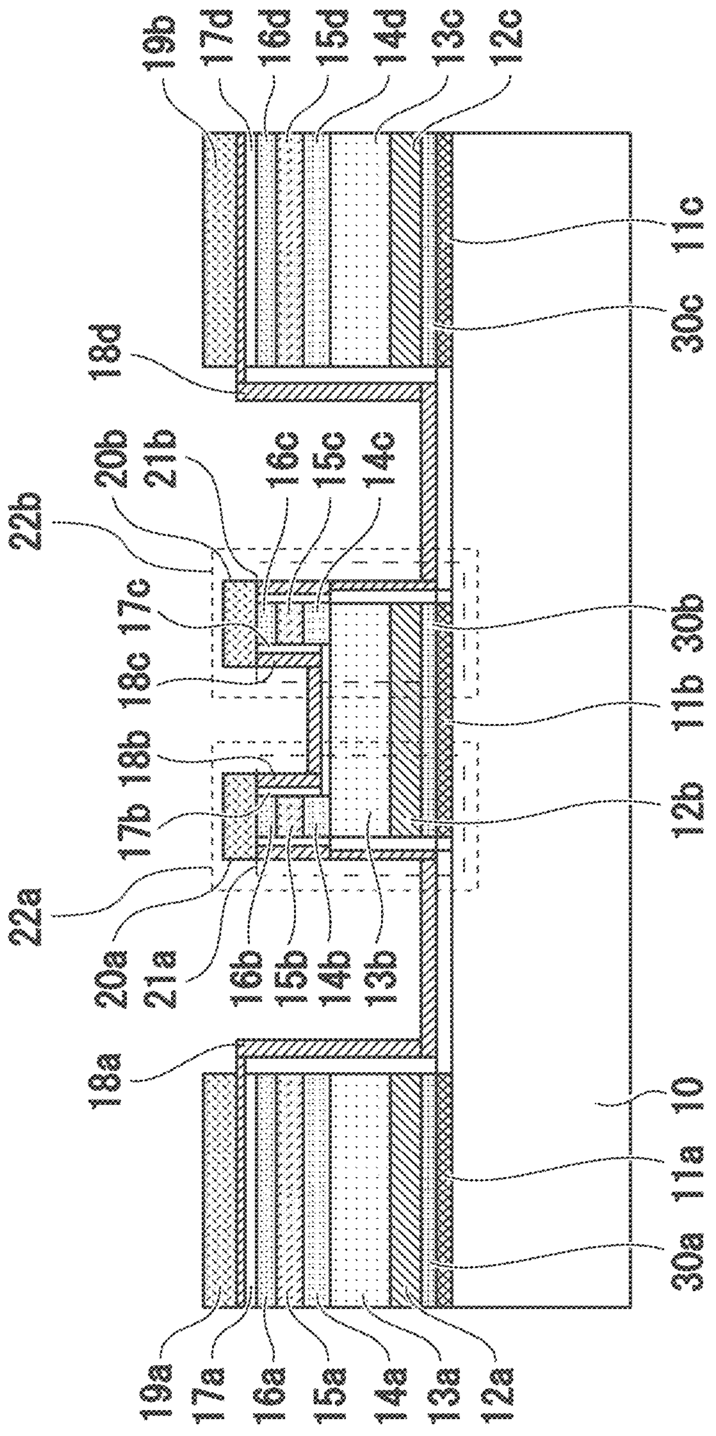
FIG. 7 is a cross-sectional view showing a refractive index modulation region of a Mach-Zehnder-type optical modulator according to a second embodiment.

FIG. 7 is a cross-sectional view showing a refractive index modulation region of a Mach-Zehnder-type optical modulator according to a second embodiment. The second embodiment is different from the first embodiment in that n-type InGaAs layers 30*a*, 30*b*, and 30*c* are provided respectively on the n-type diffusion prevention layers 11*a*, 11*b*, and 11*c*. The n-type diffusion prevention layers 11*a*, 11*b*, and 11*c* are made of n-type InP having a carrier concentration of 2.0E+18 $cm^{-3}$, for example. The n-type InGaAs layers 30 *a*, 30 *b*, and 30 *c* have a carrier concentration of 1.0E+19 $cm^{-3}$, for example.

The arm waveguide 21*a* has the substrate 10 as well as the n-type diffusion prevention layer 11*b*, the n-type InGaAs layer 30*b*, the p-type InGaAs layer 12*b*, the p-type cladding layer 13*b*, the quantum well active layer 14*b*, the n-type cladding layer 15*b*, and the n-type contact layer 16*b* formed sequentially on the substrate 10. The arm waveguide 21*b* has the substrate 10 as well as the n-type diffusion prevention layer 11*b*, the n-type InGaAs layer 30*b*, the p-type InGaAs layer 12*b*, the p-type cladding layer 13*b*, the quantum well active layer 14*c*, the n-type cladding layer 15*c*, and the n-type contact layer 16*c* formed sequentially on the substrate 10. The remaining components are similar to those of the first embodiment.

The first embodiment raises a concern that an interface between the n-type diffusion prevention layer 11*b* and the p-type InGaAs layer 12*b* is depleted to be a factor that degrades the modulation bandwidth. In contrast, in the present embodiment, the n-type InGaAs layers 30*a*, 30*b*, and 30*c* having a high carrier concentration are formed as n-type diffusion prevention layers on the n-type diffusion prevention layers 11*a*, 11*b*, and 11*c*. Since n-type InGaAs has a very small bandgap, a depletion layer can be made thin by joining the p-type InGaAs layer 12*b* and the n-type InGaAs layer 30*b*, which can reduce a capacitance caused by the tunnelling effect. As a result, the semiconductor resistance between the two optical modulation units considerably decreases, which can reduce loss of the microwave propagating through the traveling-wave electrodes to considerably improve the modulation bandwidth.

Figure 8:
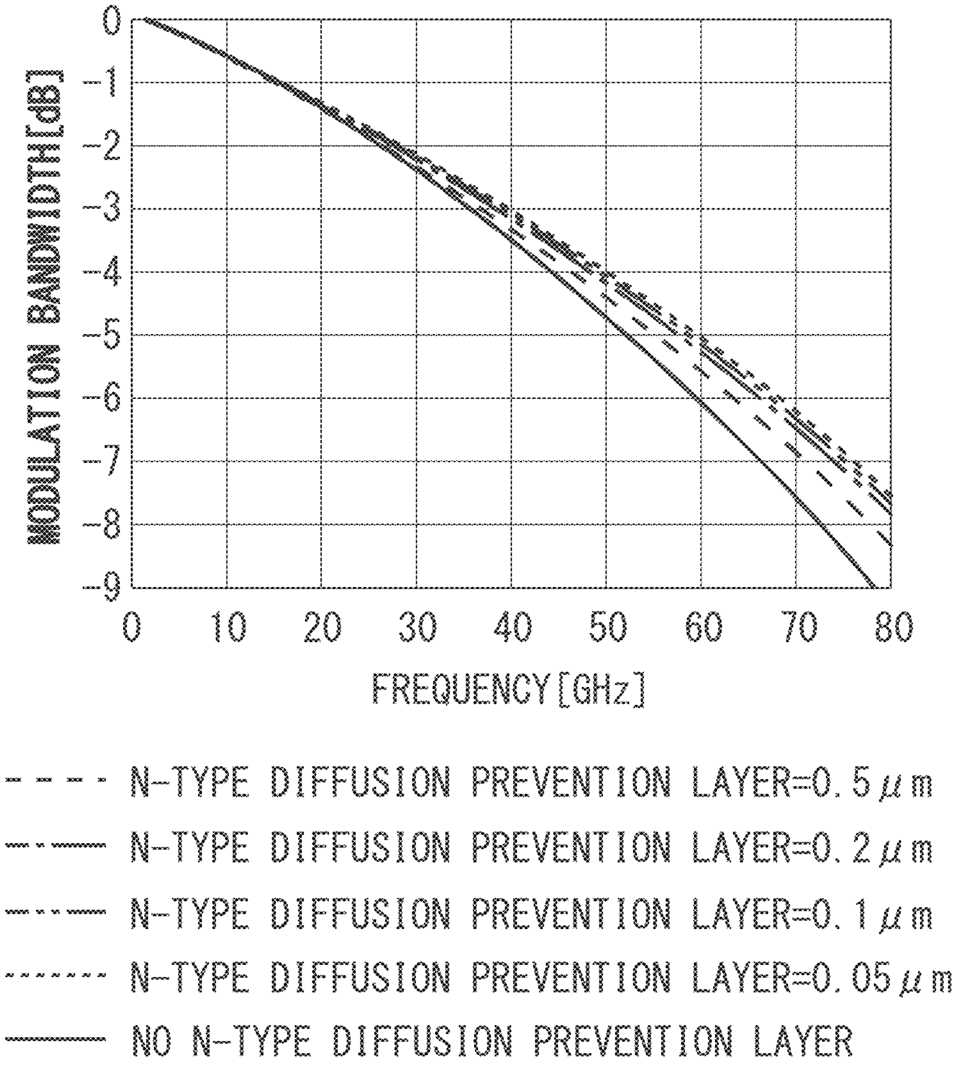
FIG. 8 is a diagram showing a result obtained by calculating the modulation bandwidth while varying the thickness of the n-type diffusion prevention layers in the second embodiment.

FIG. 8 is a diagram showing a result obtained by calculating the modulation bandwidth while varying the thickness of the n-type diffusion prevention layers in the second embodiment. The thickness of the n-type diffusion prevention layers 11*a*, 11*b*, and 11*c* is set at 2.0 μm, and the thickness of the n-type InGaAs layers 30*a*, 30*b*, and 30*c* is varied. The n-type InGaAs layers 30*a*, 30*b*, and 30*c* have a carrier concentration of 1.0E+19 $cm^{-3}$. It has been confirmed through an electromagnetic field analysis that the modulation bandwidth can be improved further by forming the n-type InGaAs layers 30*a*, 30*b*, and 30*c* with a film thickness of more than or equal to 0.05 μm.

Note that similar effects can also be obtained in a structure in which the n-type diffusion prevention layers 11*a*, 11*b*, and 11*c* are unified, the n-type InGaAs layers 30*a*, 30*b*, and 30*c* are unified, the p-type InGaAs layers 12*a*, 12*b*, and 12*c* are unified, and the p-type cladding layers 13*a*, 13*b*, and 13*c* are unified.

Third Embodiment

Figure 9:
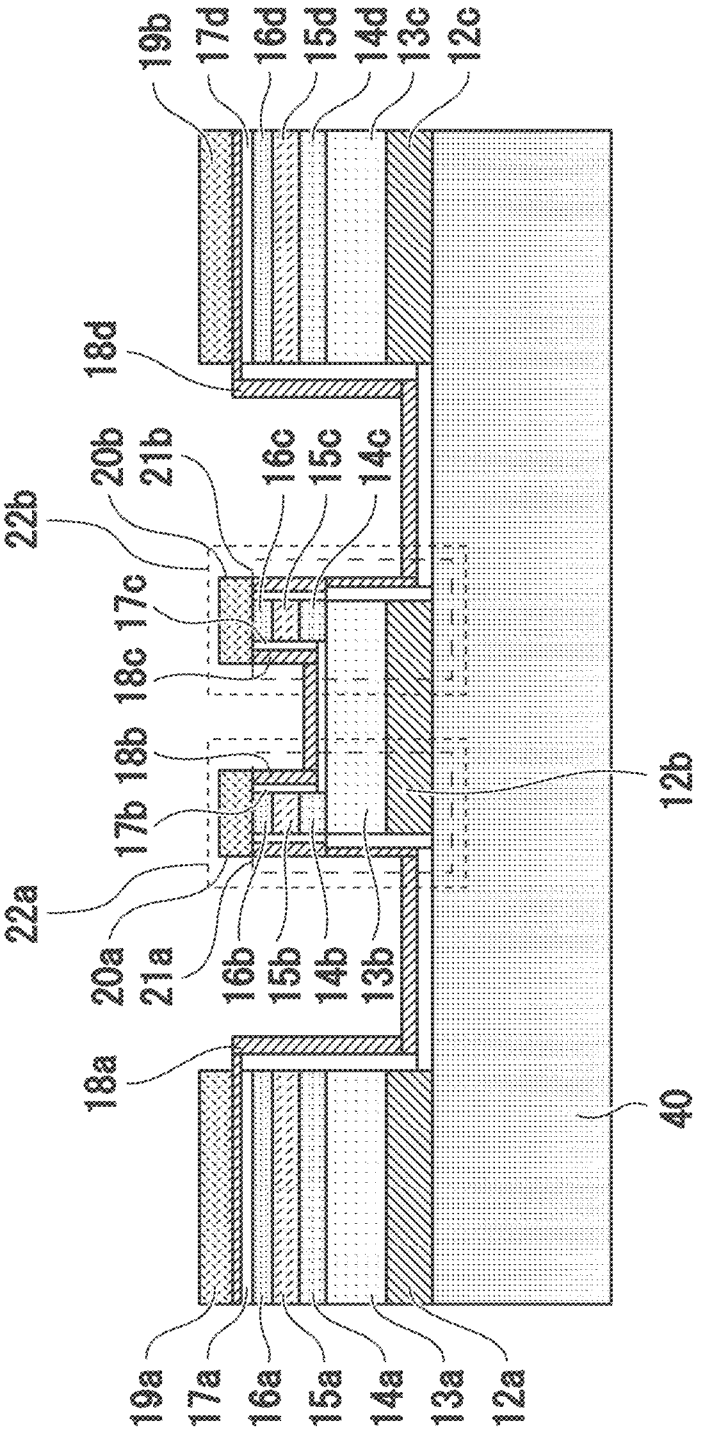
FIG. 9 is a cross-sectional view showing a refractive index modulation region of a Mach-Zehnder-type optical modulator according to a third embodiment.

FIG. 9 is a cross-sectional view showing a refractive index modulation region of a Mach-Zehnder-type optical modulator according to a third embodiment. In the present embodiment, a p-type semiconductor substrate 40 having a carrier concentration of 2.0E+18 $cm^{-3}$, for example, and made of p-type InP is used instead of the substrate 10 which is a semi-insulating semiconductor substrate. The n-type diffusion prevention layers 11*a*, 11*b*, and 11*c* are not provided.

The arm waveguide 21*a* has the p-type semiconductor substrate 40 as well as the p-type InGaAs layer 12*b*, the p-type cladding layer 13*b*, the quantum well active layer 14*b*, the n-type cladding layer 15*b*, and the n-type contact layer 16*b* stacked sequentially on the p-type semiconductor substrate 40. The arm waveguide 21*b* has the p-type semiconductor substrate 40 as well as the p-type InGaAs layer 12*b*, the p-type cladding layer 13*b*, the quantum well active layer 14*c*, the n-type cladding layer 15*c*, and the n-type contact layer 16*c* stacked sequentially on the p-type semiconductor substrate 40. The remaining components are similar to those of the first embodiment.

Figure 10:
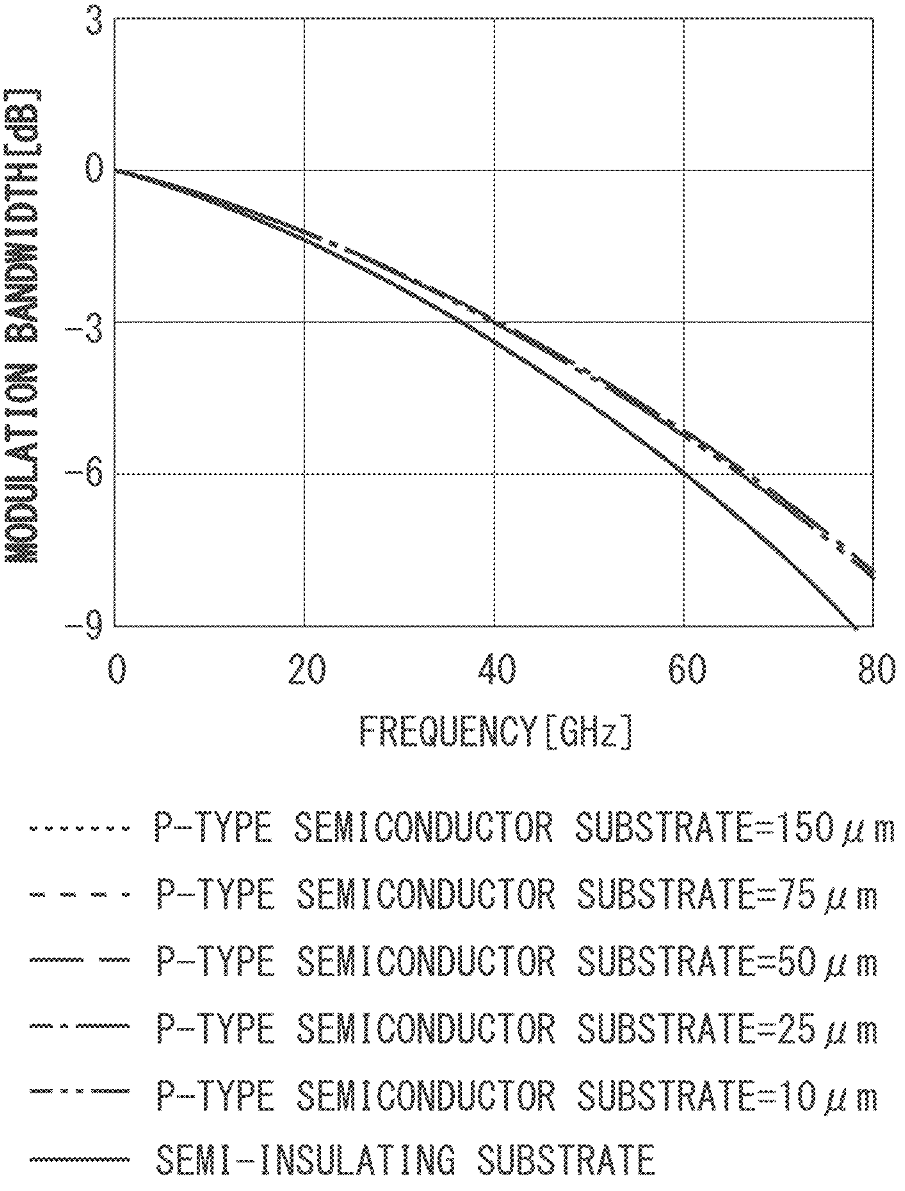
FIG. 10 is a diagram showing a result obtained by calculating frequency dependency of a modulation bandwidth according to the third embodiment.

FIG. 10 is a diagram showing a result obtained by calculating frequency dependency of a modulation bandwidth according to the third embodiment. It has been confirmed through an electromagnetic field analysis that the modulation bandwidth can be improved further by making the thickness of the p-type semiconductor substrate 40 more than or equal to 10 μm. Therefore, the thickness of the p-type semiconductor substrate 40 is set at more than or equal to 10 μm in the present embodiment. This can reduce the lower-layer semiconductor resistance to inhibit microwave loss, so that the modulation bandwidth is improved.

Note that it is needless to say that equivalent effects are also obtained even if the p-type semiconductor substrate 40 having the doping concentration of 2.0E+18 $cm^{-3}$, for example, and made of p-type InP is used in the structures of the first and second embodiments instead of the substrate 10.

Fourth Embodiment

Figure 11:
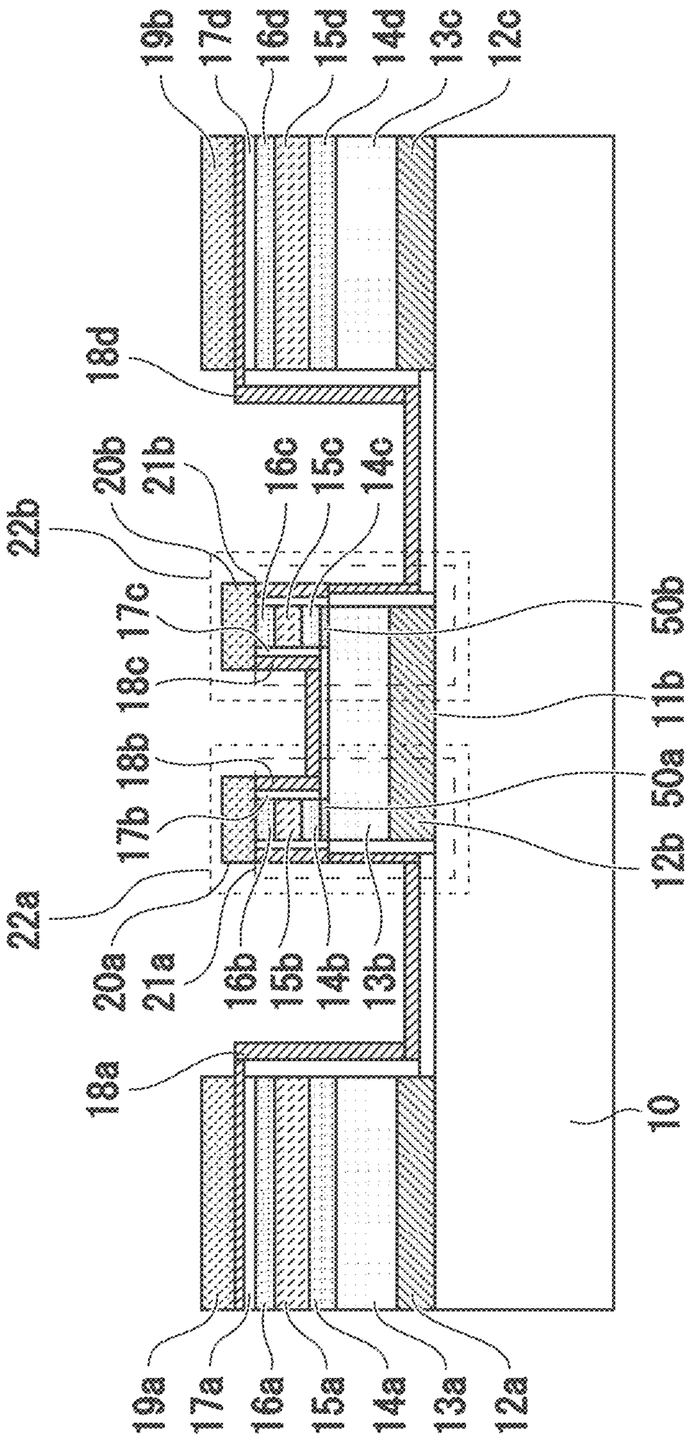
FIG. 11 is a cross-sectional view showing a refractive index modulation region of a Mach-Zehnder-type optical modulator according to a fourth embodiment.

FIG. 11 is a cross-sectional view showing a refractive index modulation region of a Mach-Zehnder-type optical modulator according to a fourth embodiment. In the present embodiment, diffusion prevention layers 50*a* and 50*b* made of a mixed crystal material containing As, such as AlGaInAs or InGaAsP, for example, are provided respectively between the quantum well active layers 14*b*, 14*c* and the p-type cladding layer 13*b*. The remaining components are similar to those of the first embodiment.

By providing the diffusion prevention layers 50*a* and 50*b*, an acceptor diffusion length can be reduced to shorten a carrier travel distance. Moreover, a doping concentration of the p-type cladding layer 13*b* can be increased to reduce resistance. The bandwidth can thus be improved. Note that the composition of the mixed crystal material containing As may be selected so as to interpolate a refractive index difference between the quantum well active layers and the p-type cladding layer.

Figure 12:
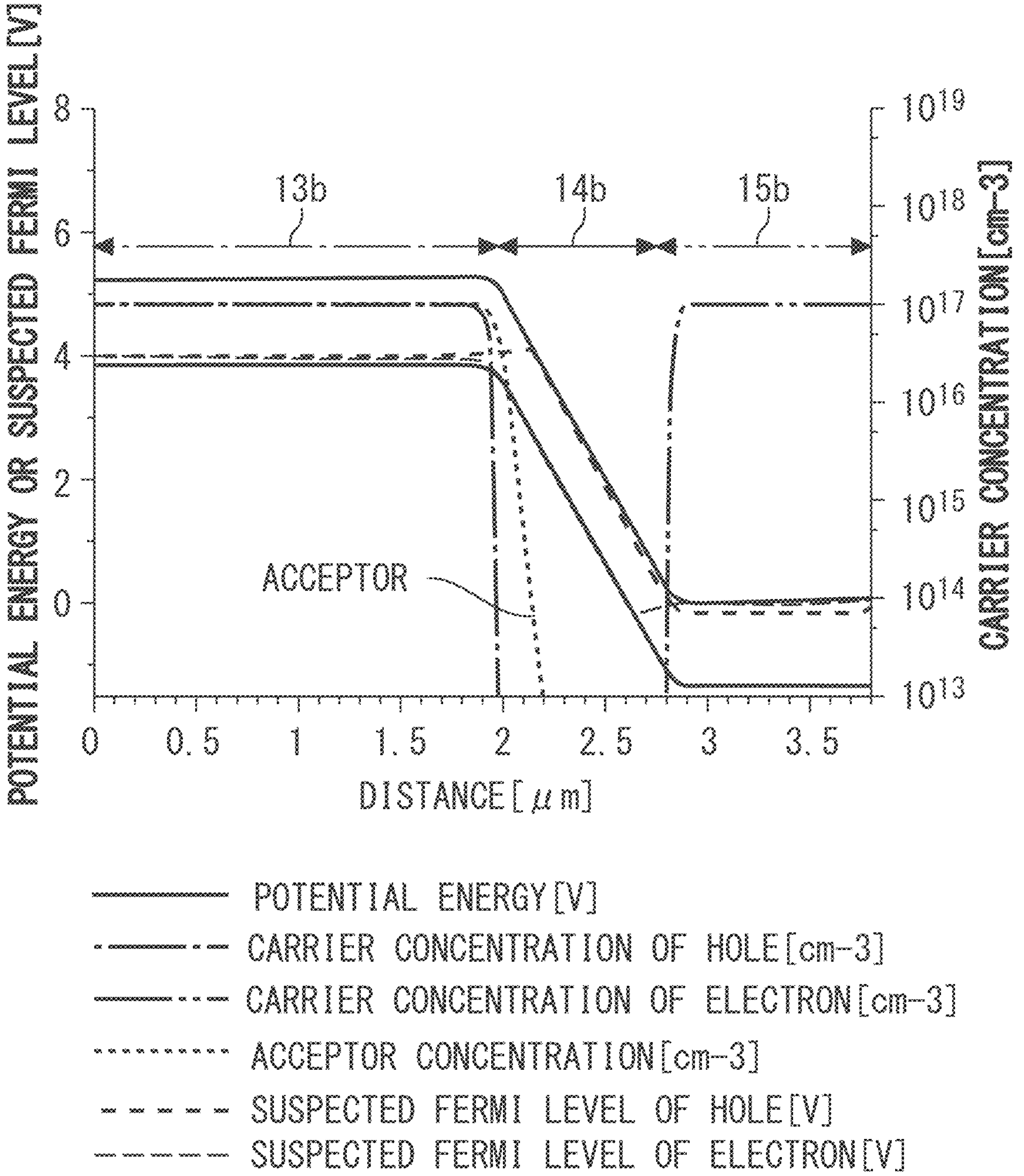
FIG. 12 is a diagram showing a result obtained by calculating acceptor diffusion length dependency of the modulation bandwidth according to the fourth embodiment.
Figure 13:
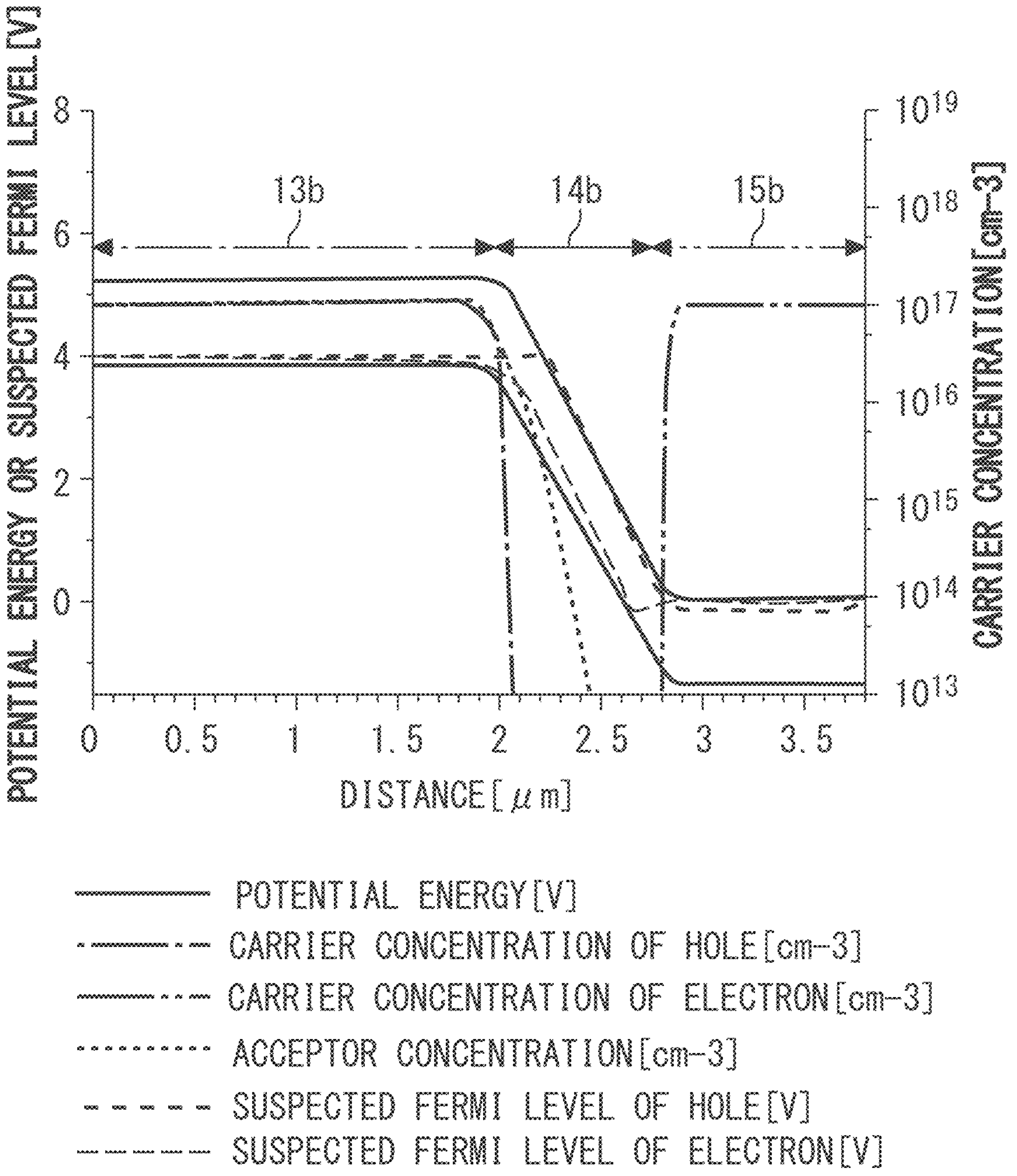
FIG. 13 is a diagram showing a result obtained by calculating acceptor diffusion length dependency of the modulation bandwidth according to the fourth embodiment.
Figure 14:
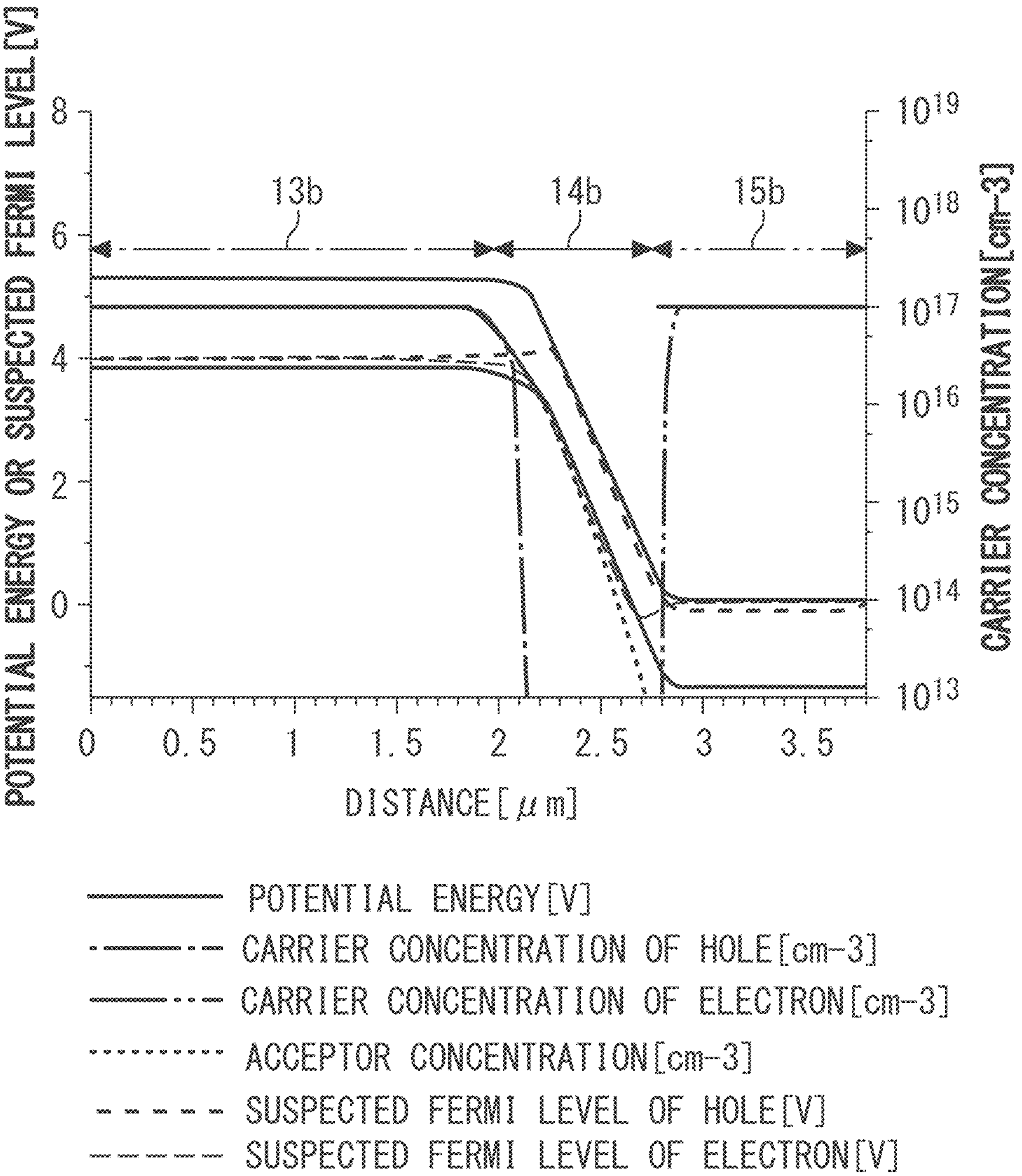
FIG. 14 is a diagram showing a result obtained by calculating acceptor diffusion length dependency of the modulation bandwidth according to the fourth embodiment.
Figure 15:
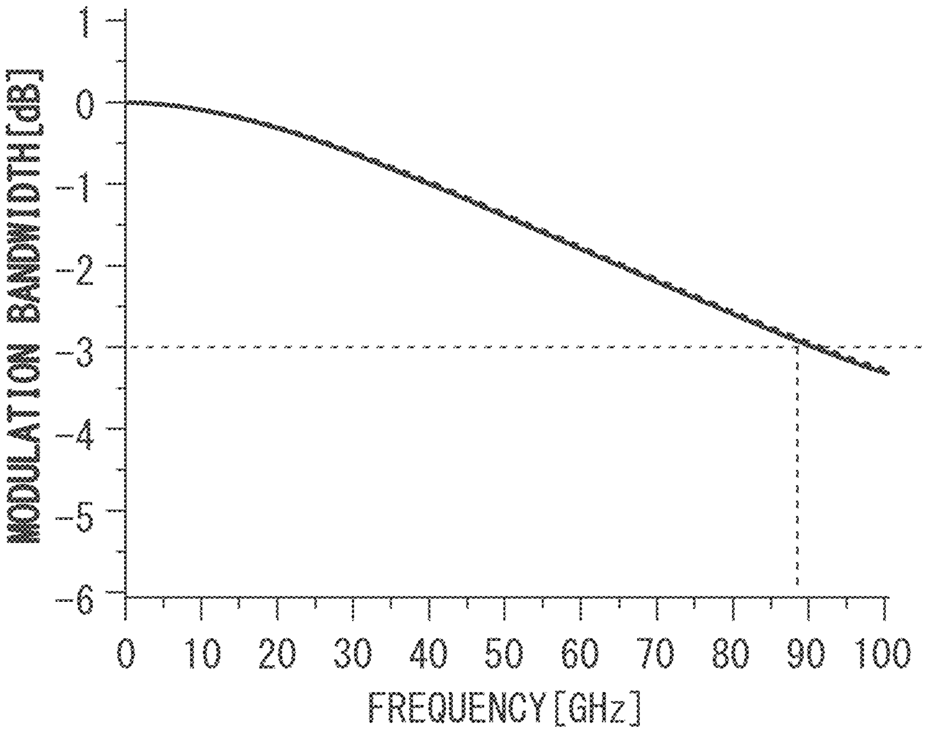
FIG. 15 is a diagram showing a result obtained by calculating frequency dependency of the modulation bandwidth according to the fourth embodiment.
Figure 16:
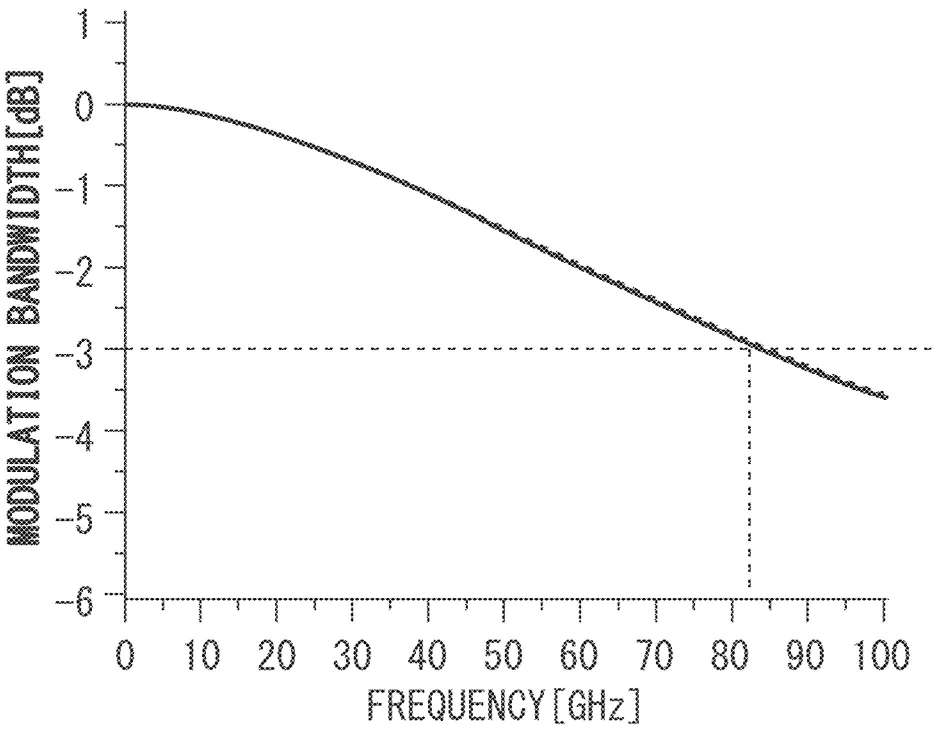
FIG. 16 is a diagram showing a result obtained by calculating frequency dependency of the modulation bandwidth according to the fourth embodiment.
Figure 17:
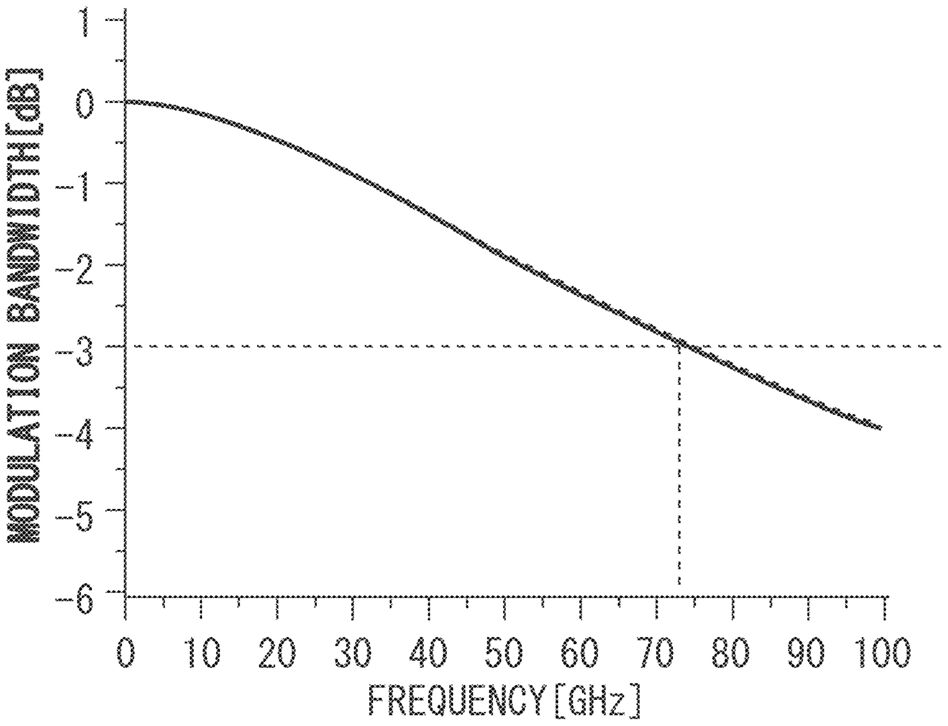
FIG. 17 is a diagram showing a result obtained by calculating frequency dependency of the modulation bandwidth according to the fourth embodiment.

FIGS. 12 to 14 are diagrams each showing a result obtained by calculating acceptor diffusion length dependency of the modulation bandwidth according to the fourth embodiment. FIGS. 15 to 17 are diagrams each showing a result obtained by calculating frequency dependency of the modulation bandwidth according to the fourth embodiment. In FIGS. 12 and 15, the acceptor diffusion length is 100 nm. In FIGS. 13 and 16, the acceptor diffusion length is 200 nm. In FIGS. 14 and 17, the acceptor diffusion length is 300 nm. In any case, the p-type cladding layer has a doping concentration of 1.0E+17 $cm^{-3}$. As the acceptor diffusion length of the p-type cladding layer indicated by a dotted line increases, a frequency at which the modulation bandwidth becomes −3 dB decreases. Consequently, it has been found that as the acceptor diffusion length increases, the modulation bandwidth is degraded.

Therefore, in the present embodiment, the diffusion prevention layer 50*a* is provided between the p-type cladding layer 13*b* and the quantum well active layer 14*b*, and the diffusion prevention layer 50*b* is provided between the p-type cladding layer 13*b* and the quantum well active layer 14*c*. The acceptor diffusion length can thereby be reduced, which enables the doping concentration of the p-type cladding layers to be set high.

Figure 18:
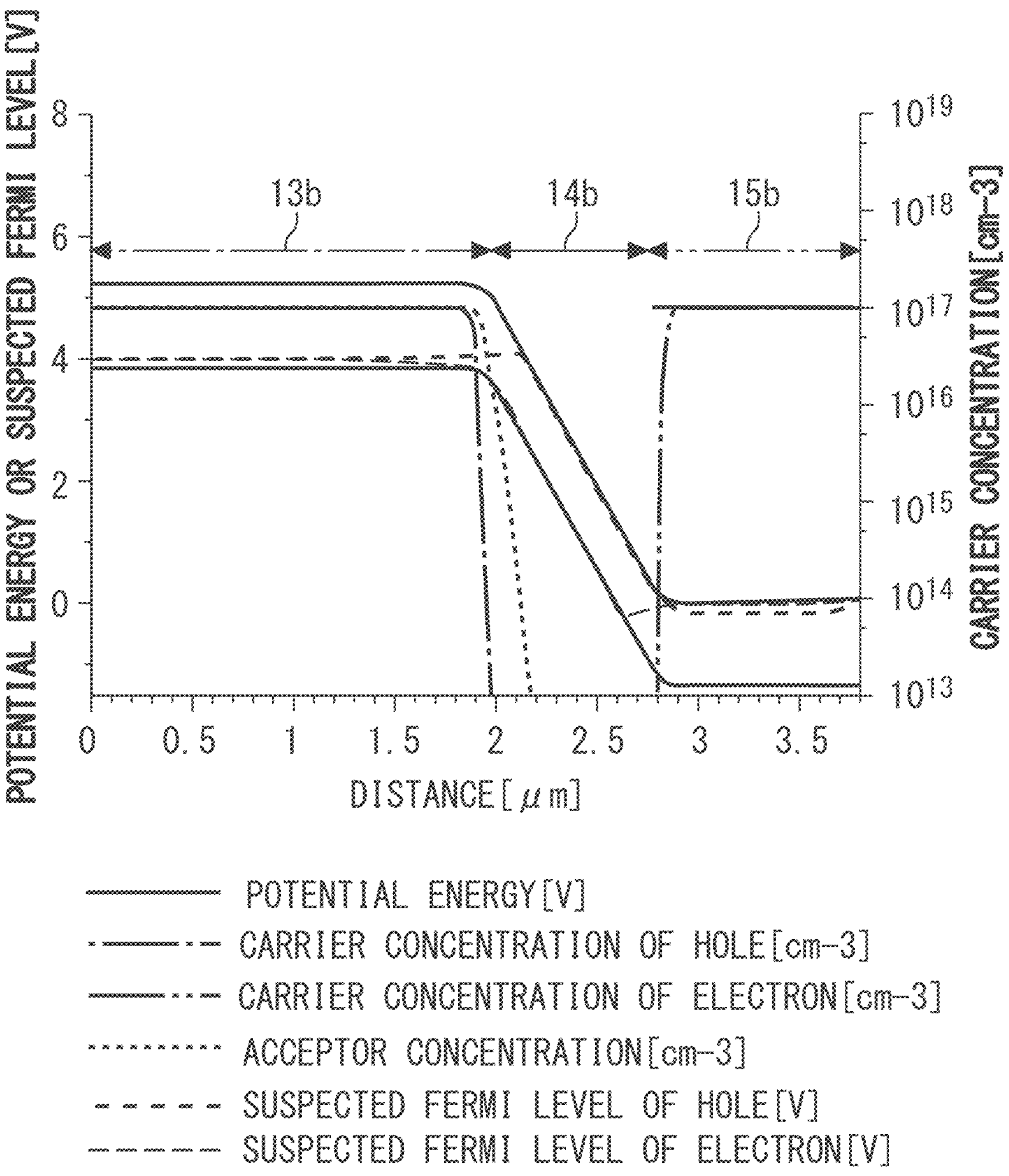
FIG. 18 is a diagram showing a result obtained by calculating acceptor diffusion length dependency of the modulation bandwidth according to the fourth embodiment.
Figure 19:
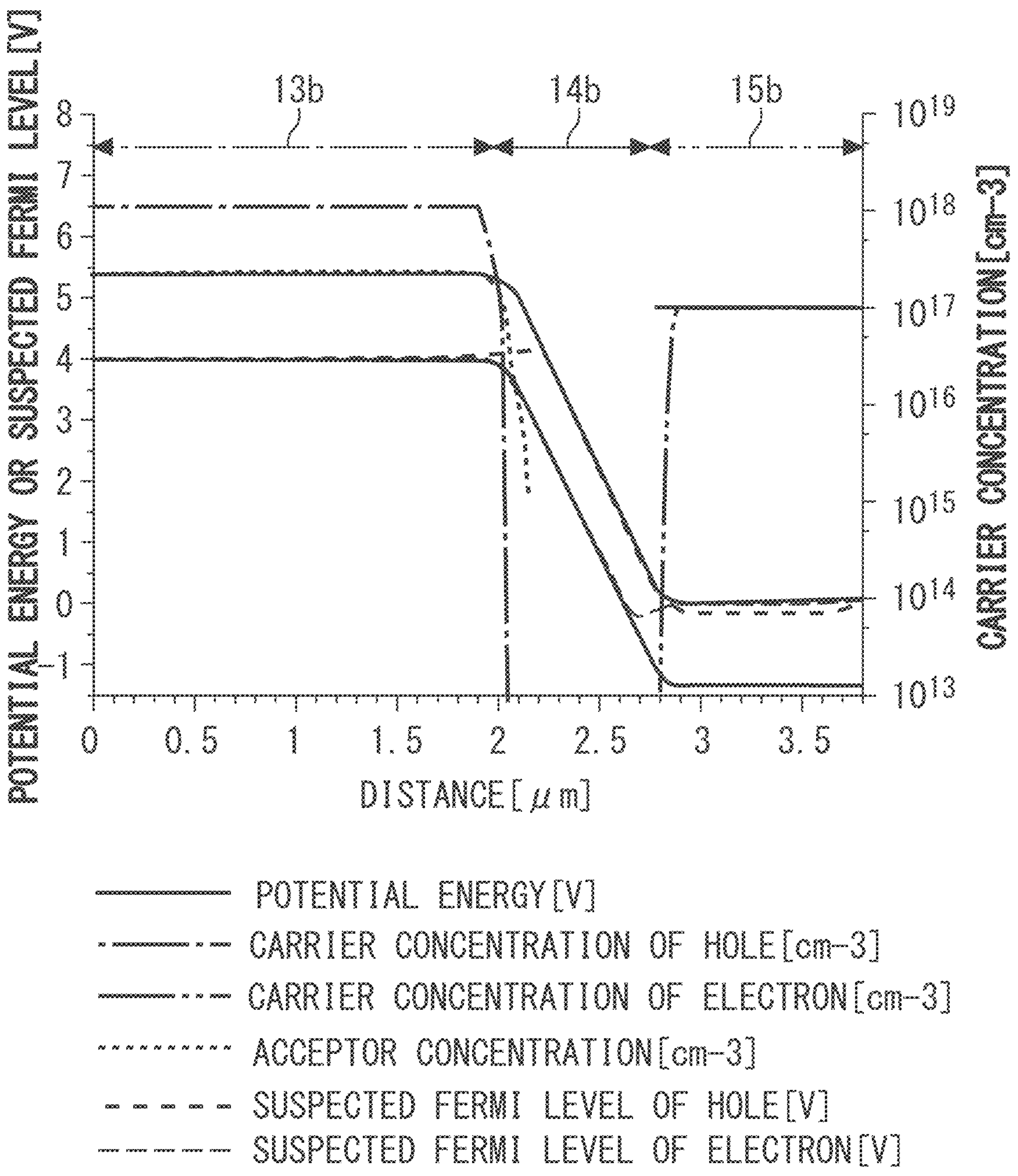
FIG. 19 is a diagram showing a result obtained by calculating acceptor diffusion length dependency of the modulation bandwidth according to the fourth embodiment.
Figure 20:
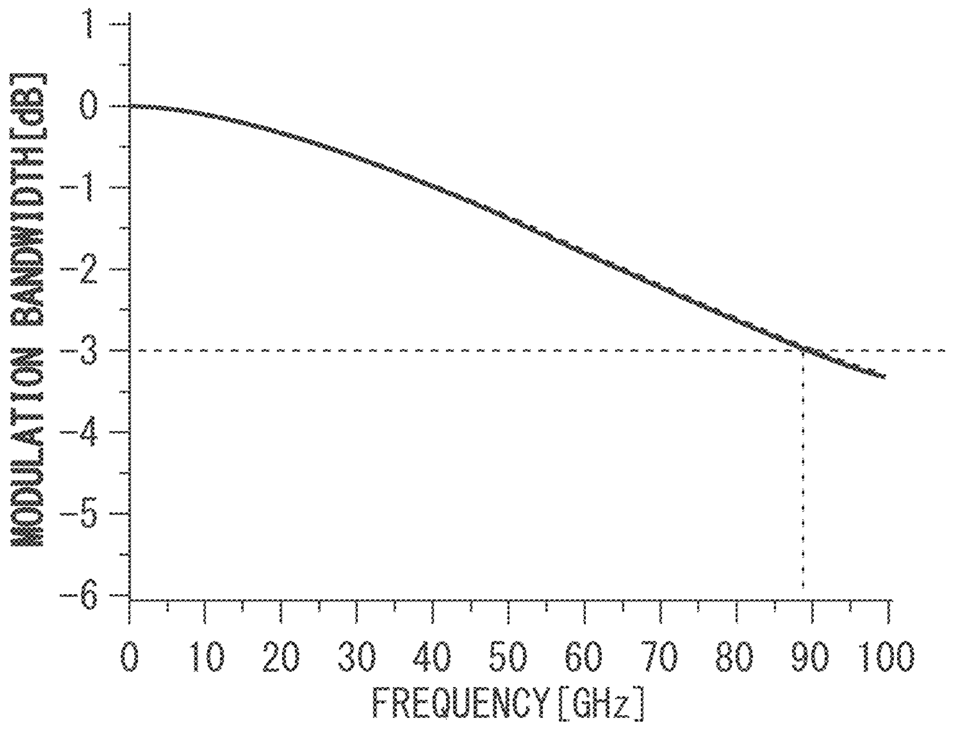
FIG. 20 is a diagram showing a result obtained by calculating frequency dependency of the modulation bandwidth according to the fourth embodiment.
Figure 21:
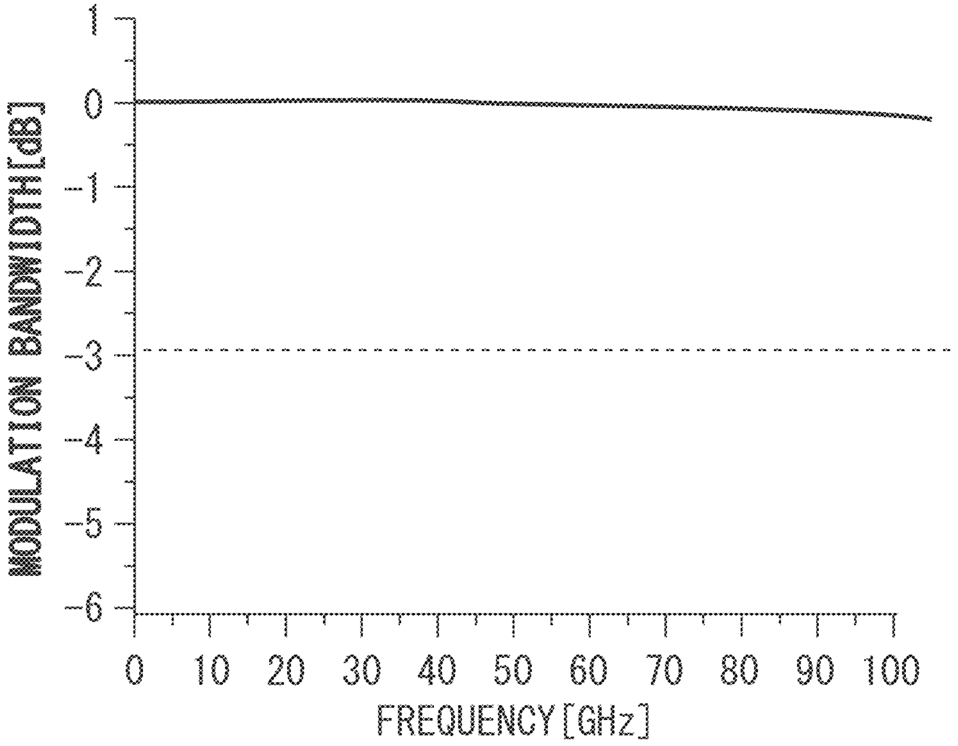
FIG. 21 is a diagram showing a result obtained by calculating frequency dependency of the modulation bandwidth according to the fourth embodiment.

FIGS. 18 and 19 are diagrams each showing a result obtained by calculating acceptor diffusion length dependency of the modulation bandwidth according to the fourth embodiment. FIGS. 20 and 21 are diagrams each showing a result obtained by calculating frequency dependency of the modulation bandwidth according to the fourth embodiment. In any case, the acceptor diffusion length is 100 nm. In FIGS. 18 and 20, the doping concentration of the p-type cladding layer is 1.0E+16 $cm^{-3}$. In FIGS. 19 and 21, the doping concentration of the p-type cladding layer is 1.0E+18 $cm^{-3}$. It has been found that the modulation bandwidth can be improved by increasing the doping concentration of the p-type cladding layer 13*b* by double digits.

In the present embodiment, the diffusion prevention layer 50*a* is provided between the p-type cladding layer 13*b* and the quantum well active layer 14*b*, and the diffusion prevention layer 50*b* is provided between the p-type cladding layer 13*b* and the quantum well active layer 14*c*. This can inhibit acceptors in the p-type cladding layer 13*b* from diffusing into the quantum well active layers 14*b* and 14*c*. The doping concentration of the p-type cladding layer can thereby be set high, so that the modulation bandwidth can be improved.

Note that it is needless to say that the diffusion prevention layers 50*a* and 50*b* of the present embodiment are also applicable to the Mach-Zehnder-type optical modulators of any of the first to third embodiments. Besides, the technical features described in the respective embodiments may be used in appropriate combination.

REFERENCE SIGNS LIST

10 substrate; 11*b* n-type diffusion prevention layer; 12*b* p-type InGaAs layer; 13*b* p-type cladding layer; 14*b*, 14*c* quantum well active layer; 15*b*, 15*c* n-type cladding layer; 20*a*, 20*b* traveling-wave electrode; 22*a*, 22*b* optical modulation unit; 27 DC bias electrode; 30*b* n-type InGaAs layer; 40 p-type semiconductor substrate; 50*a*, 50*b* diffusion prevention layer; 106 Mach-Zehnder-type optical modulator

The invention claimed is:

1. A Mach-Zehnder-type optical modulator comprising:

a substrate of semi-insulating or p-type;

an n-type diffusion prevention layer provided on the substrate;

a p-type cladding layer provided on the n-type diffusion prevention layer;

first and second quantum well active layers provided on the p-type cladding layer separately from each other;

first and second n-type cladding layers provided respectively on the first and second quantum well active layers;

first and second traveling-wave electrodes respectively connected to the first and second n-type cladding layers; and a DC bias electrode connected to the p-type cladding layer and not directly connected to the n-type diffusion prevention layer, wherein the DC bias electrode, the p-type cladding layer, the first quantum well active layer, the first n-type cladding layer, and the first traveling-wave electrode constitute a first optical modulation unit, and the DC bias electrode, the p-type cladding layer, the second quantum well active layer, the second n-type cladding layer, and the second traveling-wave electrode constitute a second optical modulation unit.

2. The Mach-Zehnder-type optical modulator according to claim 1, wherein the p-type cladding layer includes a p-type InGaAs layer, and the n-type diffusion prevention layer includes an n-type InGaAs layer joined to the p-type InGaAs layer.

3. The Mach-Zehnder-type optical modulator according to claim 1, further comprising diffusion prevention layers made of a mixed crystal material containing As and provided respectively between the first and second quantum well active layers and the p-type cladding layer.

4. The Mach-Zehnder-type optical modulator according to claim 1, wherein the p-type cladding layer of the first optical modulation unit and the p-type cladding layer of the second optical modulation unit are not separate from each other.

5. An optical transmission device comprising the Mach-Zehnder-type optical modulator according to claim 1.

* * * * *